(12) United States Patent
Lee et al.

(10) Patent No.: US 6,510,050 B1
(45) Date of Patent: Jan. 21, 2003

(54) HIGH DENSITY PACKAGING FOR MULTI-DISK SYSTEMS

(75) Inventors: Whay S. Lee, Newark; Nisha Talagala, Fremont; Chia Y. Wu, Newark; Fay Chong, Jr., Cupertino; Randall D. Rettberg, Danville, all of CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 107 days.

(21) Appl. No.: 09/718,866

(22) Filed: Nov. 21, 2000

(51) Int. Cl.$^7$ .................................................. H05K 1/14
(52) U.S. Cl. ....................... 361/685; 361/683; 361/727; 361/735; 439/59; 439/61; 439/928.1; 312/223.1; 312/223.2; 312/350
(58) Field of Search ................................. 361/685, 683, 361/724–727, 735; 439/59, 61, 62, 928.1; 312/223.1, 223.2, 222, 349, 350

(56) References Cited

U.S. PATENT DOCUMENTS

| | | | |
|---|---|---|---|
| 4,669,616 A | | 6/1987 | Mazura |
| 5,398,164 A | * | 3/1995 | Goodman et al. .......... 361/752 |
| 5,460,441 A | | 10/1995 | Hastings et al. |
| 5,515,515 A | * | 5/1996 | Kennedy et al. ............ 395/283 |
| 5,673,171 A | | 9/1997 | Varghese et al. |
| 5,715,146 A | * | 2/1998 | Hoppal ....................... 361/796 |
| 5,823,795 A | * | 10/1998 | Schumacher ............... 439/76.1 |
| 5,868,585 A | * | 2/1999 | Barthel et al. .............. 439/377 |
| 5,896,273 A | | 4/1999 | Varghese et al. |
| 6,025,989 A | | 2/2000 | Ayd et al. |
| 6,129,429 A | | 10/2000 | Hardt et al. |
| 6,317,318 B1 | * | 11/2001 | Kim ........................... 361/685 |
| 6,320,744 B1 | * | 11/2001 | Sullivan et al. ............. 361/685 |

* cited by examiner

*Primary Examiner*—Darren Schuberg
*Assistant Examiner*—David Foster
(74) *Attorney, Agent, or Firm*—Hugh H. Matsubayashi; Konrad Raynes Victor & Mann LLP

(57) ABSTRACT

A substrate for packaging a storage or server system may include one or more sections of the substrate configured to hold a two-dimensional array of disk drives. Another section of this substrate may be configured to hold circuitry for accessing the array of disk drives. This circuitry may include one or more processors. The substrate also includes a first plurality of ribs positioned in the first access of the substrate. The first plurality of ribs separate the sections from one another. The section configured to hold the control circuitry may also be configured to hold one or more power supplies for supplying power to the array of disk drives and control circuitry. This section, as well as other sections, may be divided in two by one or more additional ribs in a transverse direction. The substrate may be configured to be mounted in a cage or rack and may include an edge connector at one edge of the substrate to provide electrical connectivity to a back plane in the cage or rack. A lateral protrusion may extend along each parallel edge of the substrate for mounting the substrate in the cage or rack by sliding the substrate into the cage or rack.

52 Claims, 12 Drawing Sheets

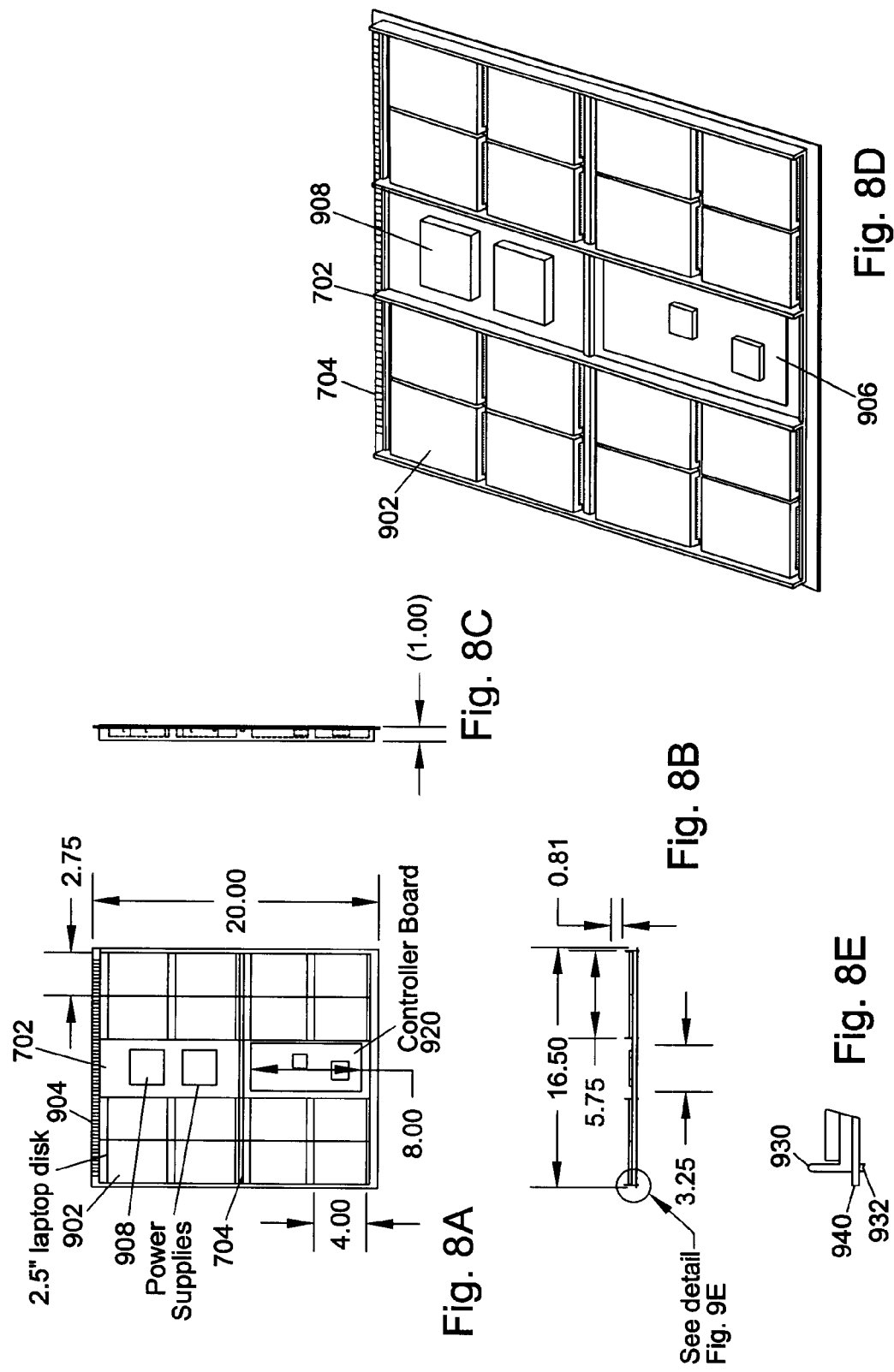

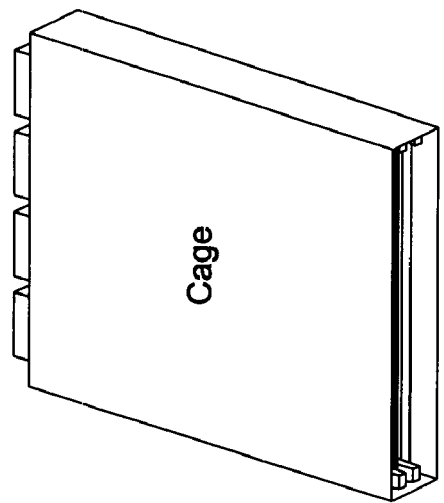
Fig. 9F
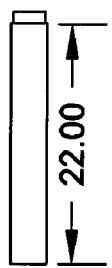
Fig. 9E
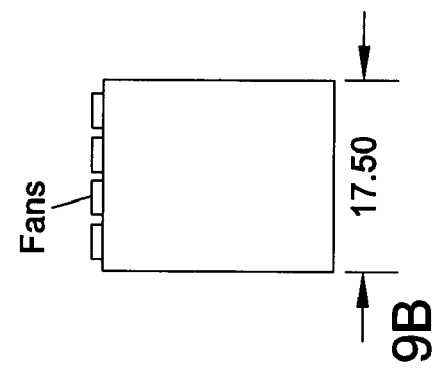
Fig. 9C
Fig. 9B
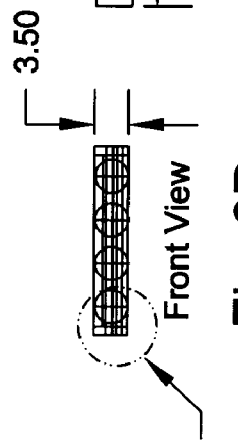
Fig. 9D
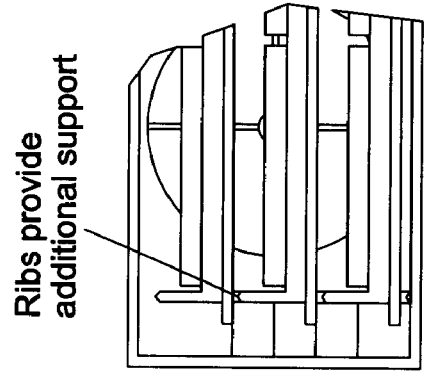
Fig. 9A

HIGH DENSITY PACKAGING FOR MULTI-DISK SYSTEMS

BACKGROUND OF THE INVENTION

1. Field of the Invention

This invention relates to the packaging of storage and/or server equipment, and more particularly a low profile tray for multi-disk storage or server systems and an enclosure for such trays.

2. Description of the Related Art

One problem facing many office computing environments is how to physically arrange and store office computing equipment in a limited amount of space. Typically, an office may have a central computing room in which most of the office server systems are located. Naturally, it is desirable for such computer rooms to require as little real estate as possible. Conventional server systems are often packaged in tower type chassis that are often not very space efficient. Such chassis are typically not stackable and may require a large amount of clearance for fan airflow, etc. Some computer environments employ racks to mount computer systems in a more space efficient manner. A standard-industrial 19 inch rack is often used. The current 19 inch industrial rack accommodates equipment trays in height units of 1.75 inches. Multiple trays may be stacked up in a single rack. However, an office may not be able to readily obtain all of its server needs in this form factor, or at the very least, its choice for file servers, email servers, web servers, network servers, etc., may be restricted if they are limited to this form factor. Furthermore, with the increasing miniaturization of components, the 1.75 inch height unit of the current industrial standard racks may be an inefficient use of space. Therefore, a more compact solution to support the physical installation of server systems may be desirable.

SUMMARY OF THE INVENTION

A ribbed tray or substrate may be provided for holding computer or storage system components. The total height of the tray and components may be less than or equal to one inch. A number of such trays may be stacked inside of a cage which may be mounted inside a standard 19 inch computer rack. Such a cage may be designed to accommodate the one inch trays or larger 1.75 inch (height) trays. Each tray may be based on a printed circuit board reinforced with metal ribs in at least one direction and preferably in both an x and y direction. A tray may be populated with low profile components so that the height of the tray including the printed circuit board thickness, ribs, components, and any necessary clearance is less than or equal to one inch. The structural ribs may be oriented to allow front to back airflow and the trays may be configured to slide into the cage independently of one another.

An edge connector at the rear of the tray printed circuit board provides connectivity between trays in the cage and to a power supply and external ports, such as a network port. In one embodiment, to maximize useful space, trays are not individually packaged inside their own metal case.

The tray may be mounted into the cage in much the same fashion as in a bakery rack. Slots may be grooved out, or rails provided in the internal sidewalls of the cages to accommodate the tray substrate. Each tray slides into the cage from the front and connects to a back plane at the rear of the cage via the printed circuit board edge connector. For a high degree of compatibility the back plane may provide a standard interconnect, such as a point to point switched interconnect (e.g., as proposed by the Infiniband Trade Association) or the PCI bus or high bandwidth variant of the PCI bus.

The ribs on each tray provide enough strength such that the tray does not collapse under its own weight. Also, to avoid sagging in the middle section, heavier components may be distributed such that most of the weight is located near ribs or near sides that slide into the cage. Also, the ribs may be designed so that vertically adjacent trays have their ribs rest on top of one another to provide additional support. Dummy trays may be inserted to maintain the support if a regular tray is removed or uninstalled.

The trays may be powered by a Telco-standard 48 volt DC supply. Local regulation may further be done on each tray to convert 48V DC to the voltages required by the equipment on the tray using "brick" or "half-brick" form factor integrated power supply modules having a low profile. The cage back plane may provide redundant power supply tracks so that multiple power supply trays, or independent supplies on the same tray, may be used for better fault tolerance. Cooling may be provided by a set of fans at the back of the cage. To facilitate front to back airflow, the cage back plane may be perforated or otherwise appropriately shaped. In one embodiment, a row of smaller fans may be included across each tray.

In one embodiment, a tray includes two ribs along the y axis which delineate the tray into multiple regions. A plurality of disk drives may be mounted in two of these regions. Power supplies and control circuitry may be located in another region. In a preferred embodiment, at least one additional rib exists along the x axis to further divide the tray. The power supply may be located on one side of this rib, and the control circuitry including one or more drive array controllers and one or more CPU's may be located on the other side of the rib. This transverse rib may also be perforated or a low height rib to facilitate front to back airflow. In one embodiment, the ribs are metal ribs and may serve as electromagnetic barriers and/or heat sinks for the power supplies. A memory backup battery may be included in the power supply section as well.

One embodiment of the cage may be configured to hold three, one inch height trays or two 1.75 inch trays. The one inch height trays may include a plurality of low profile hard drives, such as hard drives designed for laptop computers. In one embodiment, each tray may be populated with 16 such drives so that a three tray cage may include 48 low profile drives. For 25 gigabyte drives, the cage would provide 1.2 terabytes of storage. In one embodiment this may be configured to provide one terabyte of storage plus 200 gigabytes of hot spare storage. In alternate designs, larger desktop type disk drives may be used with 1.75 inch height trays. The same tray substrate design may be employed with each larger drive occupying the space allotted for two of the smaller drives. This alternate design requires no change to the printed circuit board substrate except for the possible addition of a flexible cable that connects the larger drives to the substrate connector for the smaller drives.

Thus, a substrate for packaging a storage or server system may include one or more sections of the substrate configured to hold a two-dimensional array of disk drives. Another section of this substrate may be configured to hold circuitry for accessing the array of disk drives. This circuitry may include one or more processors. The substrate also includes a first plurality of ribs positioned in the first access of the substrate. The first plurality of ribs separate the sections from one another. The section configured to hold the control circuitry may also be configured to hold one or more power supplies for supplying power to the array of disk drives and control circuitry. This section, as well as other sections, may be divided in two by one or more additional ribs in a transverse direction.

The substrate may be configured to be mounted in a cage or rack and may include an edge connector at one edge of the substrate to provide electrical connectivity to a back plane in the cage or rack. A lateral protrusion may extend along each parallel edge of the substrate for mounting the substrate in the cage or rack by sliding the substrate into the cage or rack.

A storage or computing system may be provided including a two-dimensional array of disk drives mounted to a substrate. The two-dimensional array of disk drives may extend across the substrate along a first axis and second axis. Circuitry for controlling the two-dimensional array disk drives may also be included. This circuit may be mounted to the substrate and may include one or more processors. A first plurality of ribs may be positioned in the direction of the first axis separating the two-dimensional array of disk drives from the circuitry. A second plurality of ribs may be positioned in the direction of a second axis of the substrate perpendicular to the first axis. These ribs may be perforated or low profile ribs to facilitate airflow in the direction of the first axis.

A cage mounted storage or computing system may include a cage having a plurality of slots and a plurality of trays each mounted in one of the slots. Each tray may include a two-dimensional array disk drives mounted to a substrate. The two dimensional array disk drives may extend across the substrate along a first axis and a second axis of the substrate. Circuitry for controlling the two-dimensional array of disk drives may be mounted on the substrate and may include one or more processors. The plurality of trays may be mounted in the cage in a vertical stack. Each of the trays may include a first plurality of ribs positioned in the direction of a horizontal first axis. These ribs may be configured to rest upon corresponding top portions of ribs for an immediately lower tray. One of the trays may be a dummy tray configured to provide mechanical support via the ribs. A back plane may be provided at the back of a cage configured to provide power and I/O signals to each tray. The back plane may provide redundant power paths and may provide connections to I/O ports, such as network ports and may include an I/O interconnect fabric. One or more fans may be included at the rear of the cage. Additionally, each tray may be configured as an independent field replaceable unit with no field serviceable internal parts. Thus, if a tray fails, instead of field servicing its internal components, the entire tray is replaced as a whole.

BRIEF DESCRIPTION OF THE DRAWINGS

FIG. 8A illustrates a top view of another embodiment of a low profile substrate or tray for packaging a computer system;

FIG. 8B illustrates a longitudinal side view of another embodiment of a low profile substrate or tray for packaging a computer system;

FIG. 8C illustrates a latitudinal side view of another embodiment of a low profile substrate or tray for packaging a computer system;

FIG. 8D illustrates a perspective view of another embodiment of a low profile substrate or tray for packaging a computer system;

FIG. 8E illustrates a detail section of a corner of a substrate or tray for packaging a computer system, according to one embodiment;

FIG. 9A illustrates a partial frontal view of a cage or enclosure for mounting multiple low profile substrates or trays for packaging a computer or storage system(s), according to one embodiment;

FIG. 9B illustrates a top view of a cage or enclosure for mounting multiple low profile substrates or trays for packaging a computer or storage system(s), according to one embodiment;

FIG. 9C illustrates a rear view of a cage or enclosure for mounting multiple low profile substrates or trays for packaging a computer or storage system(s), according to one embodiment;

FIG. 9D illustrates a front view of a cage or enclosure for mounting multiple low profile substrates or trays for packaging a computer or storage system(s), according to one embodiment;

FIG. 9E illustrates a side view of a cage or enclosure for mounting multiple low profile substrates or trays for packaging a computer or storage system(s), according to one embodiment; and FIG. 9F illustrates a perspective view of a cage or enclosure for mounting multiple low profile substrates or trays for packaging a computer or storage system(s), according to one embodiment.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF EMBODIMENTS OF THE INVENTION

Figure 1:
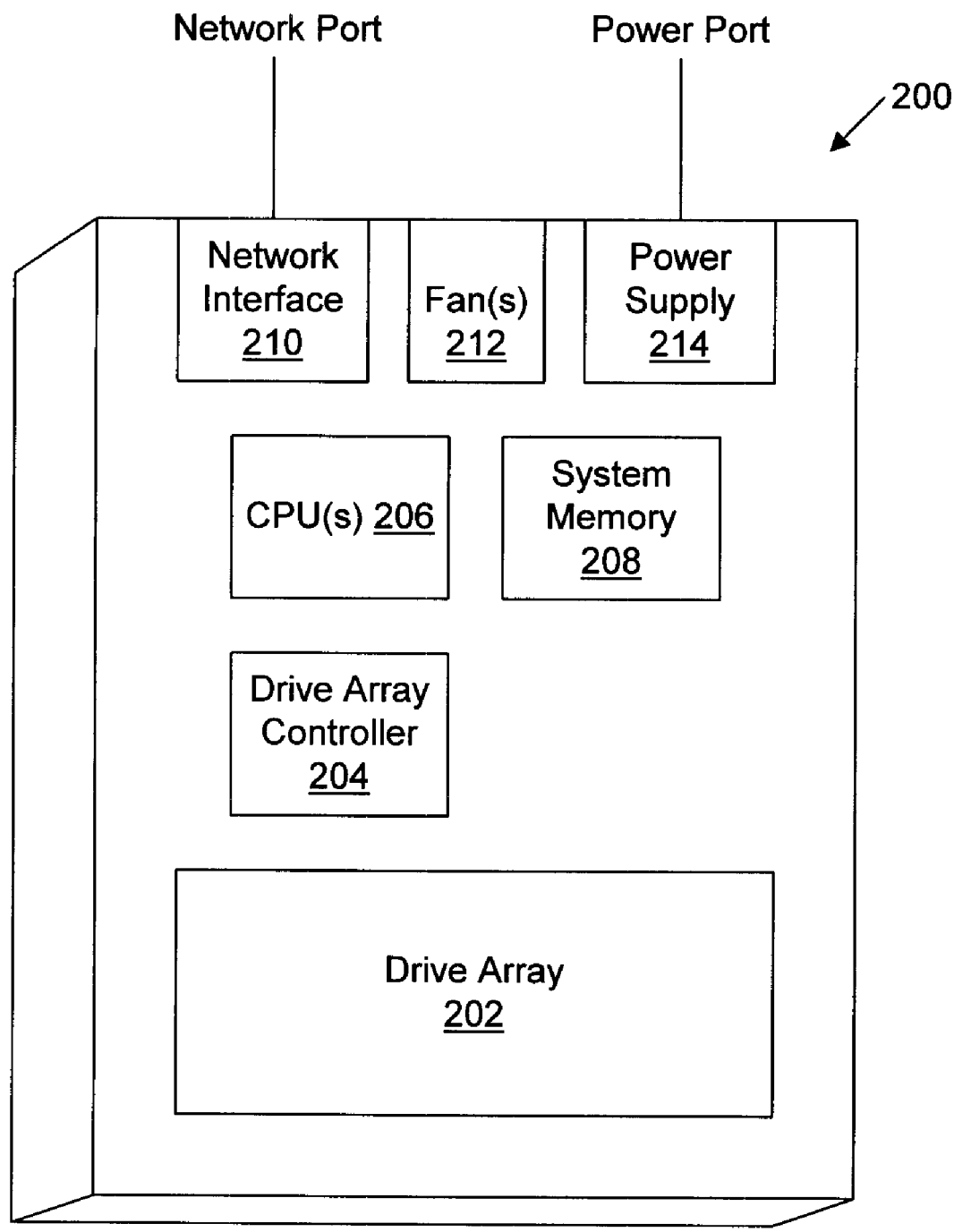
FIG. 1 is an illustration of a computer of storage system including multiple hard drives and configured as a single field replaceable unit, according to one embodiment.

Conventional storage systems are typically designed to allow for replacement or hot swapping of most essential components, such as disk drives, fans, power supplies, etc. In contrast, FIG. 1 illustrates a storage system 200 assembled as a field replaceable unit, according to one embodiment. The entire system 200 may be a single field replaceable unit (FRU). Storage system 200 may include multiple individual disk drives to provide a large storage capacity which is implemented as a single field replaceable unit. Since there are no or a reduced number of field replaceable or hot swappable internal parts, storage system 200 may have a storage density that is not possible with storage systems that support field or hot replacement of components, such as disk drives.

Storage system 200 includes a drive array 202. Drive array 202 may include multiple hard disk drives. Each hard disk drive is configured within system 202 so as not to be individually replaceable in the field. Thus, the drives of disk array 202 may be packaged much more densely within system 200 than in conventional systems supporting field replacement. In one embodiment, drive array 202 include eight low profile ATAtype disk drives. The drives may be attached to a PC motherboard. In other embodiments, drive array 202 may include multiple hard drives designed for interface to SCSI, fibre channel, or other interconnect architectures. Drive array 202 may be coupled to one or more drive array controllers 204. In one embodiment, drive array controller 204 includes four ATA drive controllers supporting two ATA-type drives each. Alternatively, a fewer number of ATA controllers may be used in conjunction with a switch that allows for more than two ATA type drives to be connected to each ATA controller port. Alternatively, drive array controller 204 may be one or more SCSI drive array controllers or any other type of drive array controller for controlling arrays of multiple disk drives. Drive array controller 204 and drive array 202 may be configured as a RAID drive array.

One or more CPU's 206 and system memory 208 may also be included within the single field replaceable unit 200. CPU's 206 may operate to export or present drive array 202 as one or more file systems through a network interface 210. The single field replaceable unit 200 may also include a power supply 214 and one or more fans 212. In one embodiment fans 212 may include a row of fans positioned between drive array 202 and one or more CPU's 206. Power supply 214 may be configured to supply power to CPU's 206, system memory 208, network interface 210, drive controller 204 and drive array 202. The power supply 214 is part of the single field replaceable unit and configured not to be individually field serviceable or field replaceable. In one embodiment, the entire single field replaceable unit 200 is configured to be rack mounted and has a height less than or equal to 1.75 inches. In another embodiment the height may be limited to only one inch.

Figure 2:
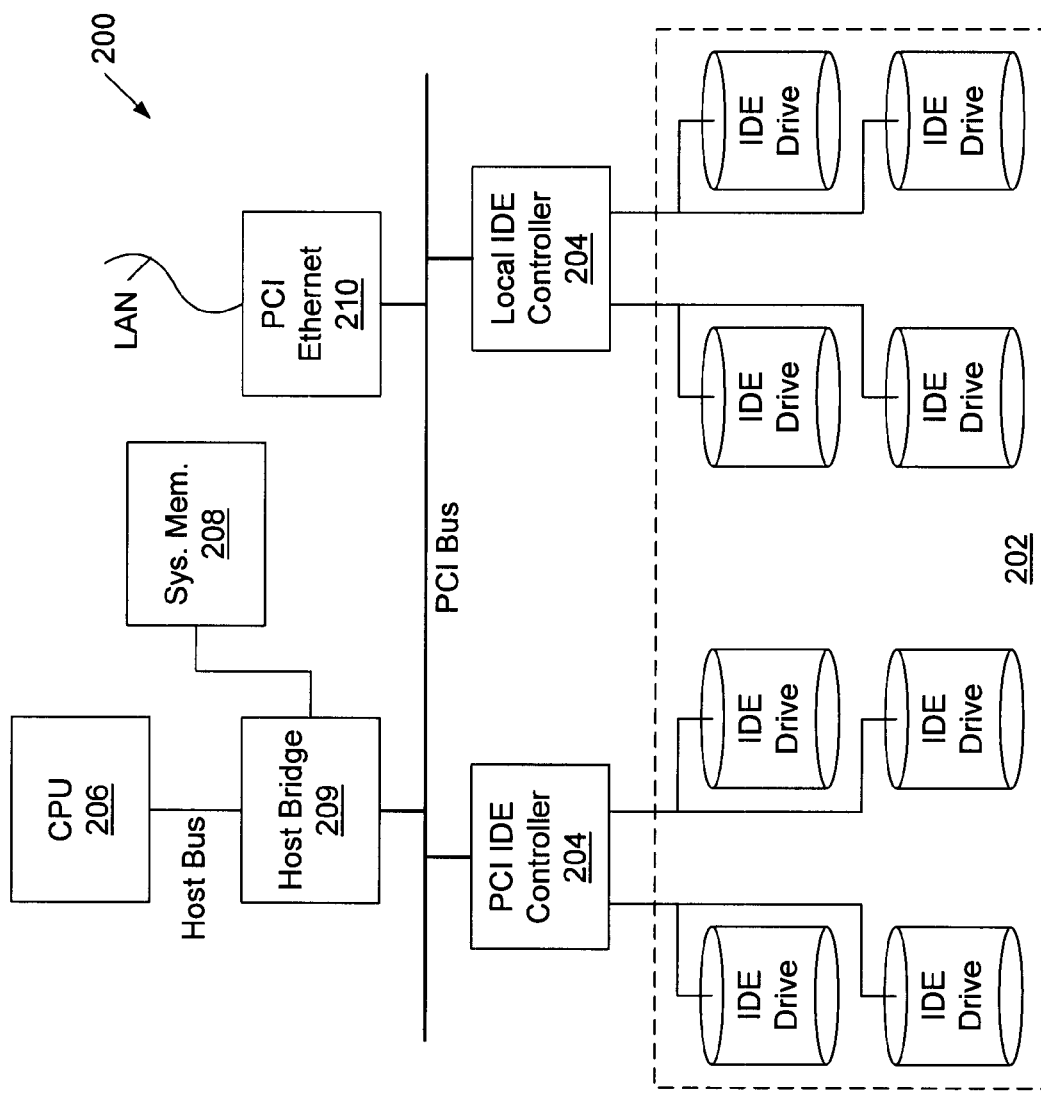
FIG. 2 is a block diagram of a storage or computer system that may be implemented as a single field replaceable unit, according to one embodiment.

FIG. 2 illustrates a field replaceable unit 200 according to one embodiment. The system includes one or more CPU's 206. In one embodiment, CPU's 206 may be one or more Sparc type processors. Alternatively, Pentium® type, Power PC® type or other types of processors may be employed. A host bridge 209 may be included to interface CPU's 206 to system memory 208 and an interconnect bus such as a PCI bus. A network interface 210 may be included to provide an interface to a network, such as a LAN. Drive controllers 204 are coupled to the interconnect bus and may be ATA/IDE type controllers in one embodiment. In the embodiment shown in FIG. 2, drive controllers 204 include four ATA/IDE controllers, each controlling two ATA/IDE drives so that drive array 202 includes eight ATA/IDE drives. In one embodiment, 34 gigabyte ATA/IDE drives are used so that the single field replaceable unit provides approximately 250 gigabytes of storage. ATA/IDE drives may be preferable for their lower cost and availability. However, other types of drives, such as SCSI, may be employed. Drive array 202 coupled to the one or more drive controllers 204 may be configured to be organized into one or more RAID logical volumes and exported or presented to client machines as one or more file systems through network interface 210. The processor 206, system memory 208, network interface 210, one or more drive controllers 204, and drive array 202 are packaged or assembled as a single field replaceable unit so that processor 206, system memory 208, network interface 210, one or more drive controllers 204, and the drives of drive array 202 are configured not to be individually field serviceable or field replaceable.

Software running on processor 206 exports or presents the disk storage 202 as an NFS (Network File System) or CIFS (Common Internet File System) file system to a network through network interface 210 so that the file system may be mounted by client machines connected to the network. In one implementation, a Solaris® operating system is run using the DiskSuite software to organize the disk drives into RAID logical volumes. File systems are then built on these logical volumes and exported or presented to clients using either NFS (for Unix clients) or a program such as Samba (for exporting to Windows clients). In another embodiment, system 200 runs the Linux operating system internally using the Linux multi-device management software to configure RAID volumes. These volumes are exported or presented to clients in the same way as in the Solaris implementation.

Thus, a single field replaceable unit including all the components necessary to provide for a large RAID storage system is provided. The single field replaceable unit may include one or more processors, a network interface coupled to the processors, and an array of disk drives coupled to the processors and network interface. The array of disk drives may be configured to be provided as one or more file systems through the network interface. The processor network interface and array of disk drives are configured not to be individually field serviceable or field replaceable. Such a single field replaceable unit may be coupled to a network through the network interface so that one or more client machines may be coupled to the network and configured to access over the network the file systems provided by the single field replaceable unit. The number of physical disk drives of drive array 202 in a single field replaceable unit may be fixed so that disk drives may not be added or subtracted from the unit in the field.

A large amount of storage configured as one or more network file systems and as one or more RAID logical volumes, for example, may be provided as a single field replaceable unit. All components necessary to implement such a, system including CPU, system memory, and network interface, necessary for exporting or presenting the file system to the network, the drive array controllers, and drive array itself are provided within the single field replaceable unit. In some embodiments, the single field replaceable unit is sealed so that the internal components are not readily accessible in the field. In some embodiments, these components are mounted or configured within the single field replaceable unit so as not to be individually field serviceable or field replaceable. The single field replaceable unit 200 may also include fans and a power supply which are also not field serviceable or replaceable. Thus, if a critical component of the system 200 fails, then the entire field replaceable unit is replaced for a new unit. In one embodiment, the field replaceable unit may include a data siphon port to facilitate the transfer of data from the drive array of the old unit to the new unit. By not supporting any field replacement and/or serviceability of internal parts, the system 200 may be designed much more densely than other storage systems that provide and equivalent amount of storage (e.g., at least a quarter of a terabyte of storage). The single field replaceable unit 200 also eliminates time spent having to trouble shoot individual components in the field. Instead, the entire unit is replaceable.

Figure 3:
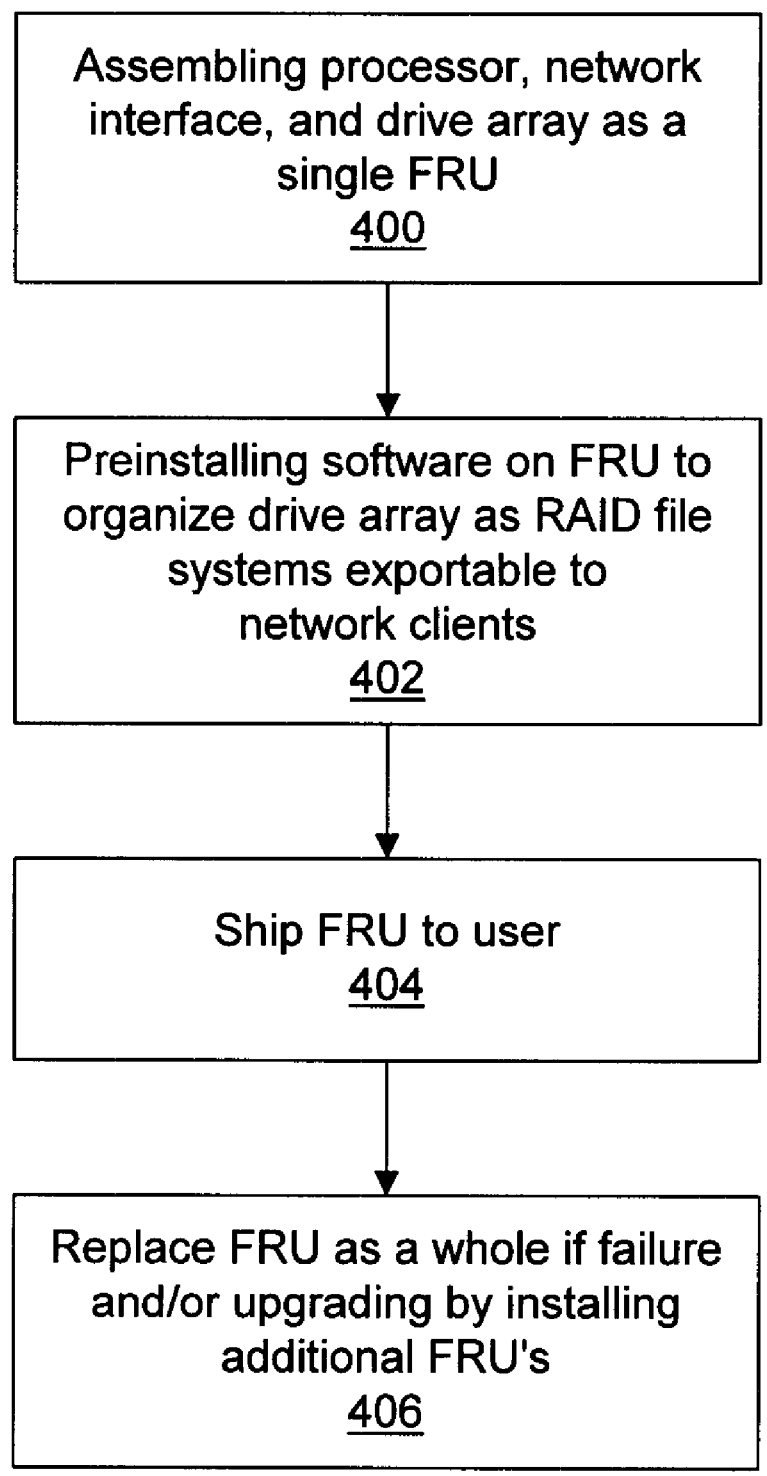
FIG. 3 is a flow diagram illustration of a method for providing a storage system as a single field replaceable unit, according to one embodiment.

Turning now to FIG. 3, a method is illustrated for providing a storage system as a single field replaceable unit, according to one embodiment. The method includes packaging or assembling the components of the storage system, such as one or more processors, a network interface, and a drive array, as a single field replaceable unit, as indicated at 400. The single field replaceable unit may have no field serviceable or replaceable internal parts. Software may be preinstalled at the manufacturer on the field replaceable unit to organize the drive array into one or more RAID logical volumes to be exported or presented to client machines as one or more file systems through the network interface. After assembling the components as a single field replaceable unit and preinstalling the RAID and file system software, the single field replaceable unit is shipped to a user, as indicated at 404. If a failure occurs, the entire field replaceable unit is replaced (e.g. by the manufacturer) as a whole, as indicated at 406. Also, since the single field replaceable unit cannot be individually upgraded by installing additional internal components, the user may upgrade by installing additional single field replaceable units.

Figure 4:
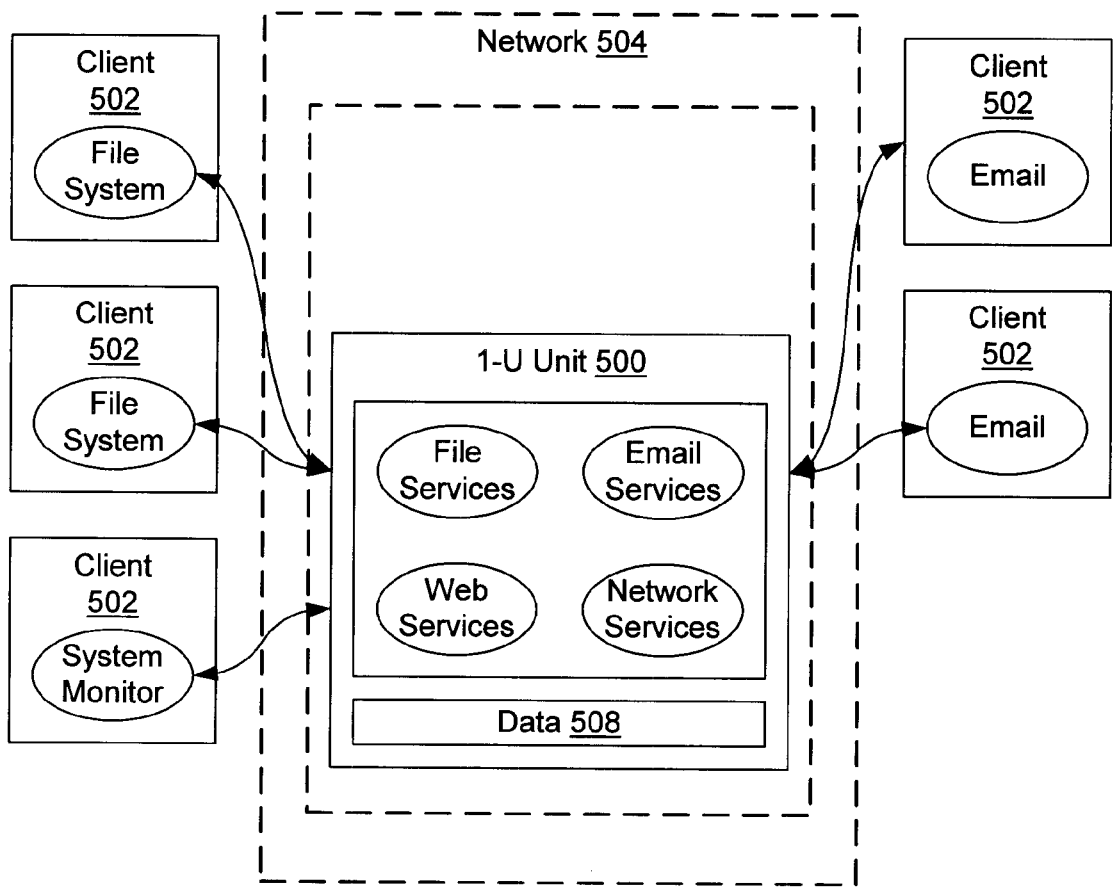
FIG. 4 is an illustration of a network system in which a single unit provides all of an office main compute services, according to one embodiment.

Turning now to FIG. 4, a network system is shown including one or more client computers 502 coupled to a network 504, according to one embodiment. The client machines 502 may be desktop PC's, workstations, terminal devices, etc., as may be found in typical office environments. The network 504 may be a local area network (LAN), for example, employing the Ethernet protocol. The client computers 502 obtain multiple office computing services from a single unit 500 also coupled to network 504. File services, email services, web services, and network services, for example, are all provided by the single unit 500. Thus, multiple or even all of an office's main computing services are provided by the single unit 500.

Single unit 500 includes a large amount of local storage 508. This local storage may be an array of disk drives configured to be supplied as one or more file systems to the clients 502 over network 504. The drive array may be configured as one or more logical RAID volumes. Single unit 500 performs file services, making the storage 508 accessible to client machines 502 over network 504. Single unit 500 also may perform network services for an office environment. Network services may include the issuance of IP (Internet Protocol) addresses for network clients. In one embodiment, IP addresses may be issued dynamically through Dynamic Host Configuration Protocol (DHCP) services. The single unit 500 may also operate a web service that serve pages from storage 508. Thus, single unit 500 may perform as a web server for an office in which web pages and other web related data are stored on storage 508. The web service provided by single unit 500 may also be the primary access point for administering single unit 500. The single unit 500 may also operate mail services over network 504 for the client machines 502. The software to implement the above described services may be preinstalled on the single unit 500 before shipping so that the end user may simply connect the single unit to its network to obtain many or all of the office computing services on a single unit. Thus, single unit 500 may be the central point for most or all main office computing services to client machines 502. Not all of the services illustrated in FIG. 4 may be required in all offices. Also, additional services beyond those illustrated may be provided by single unit 500.

Figure 5:
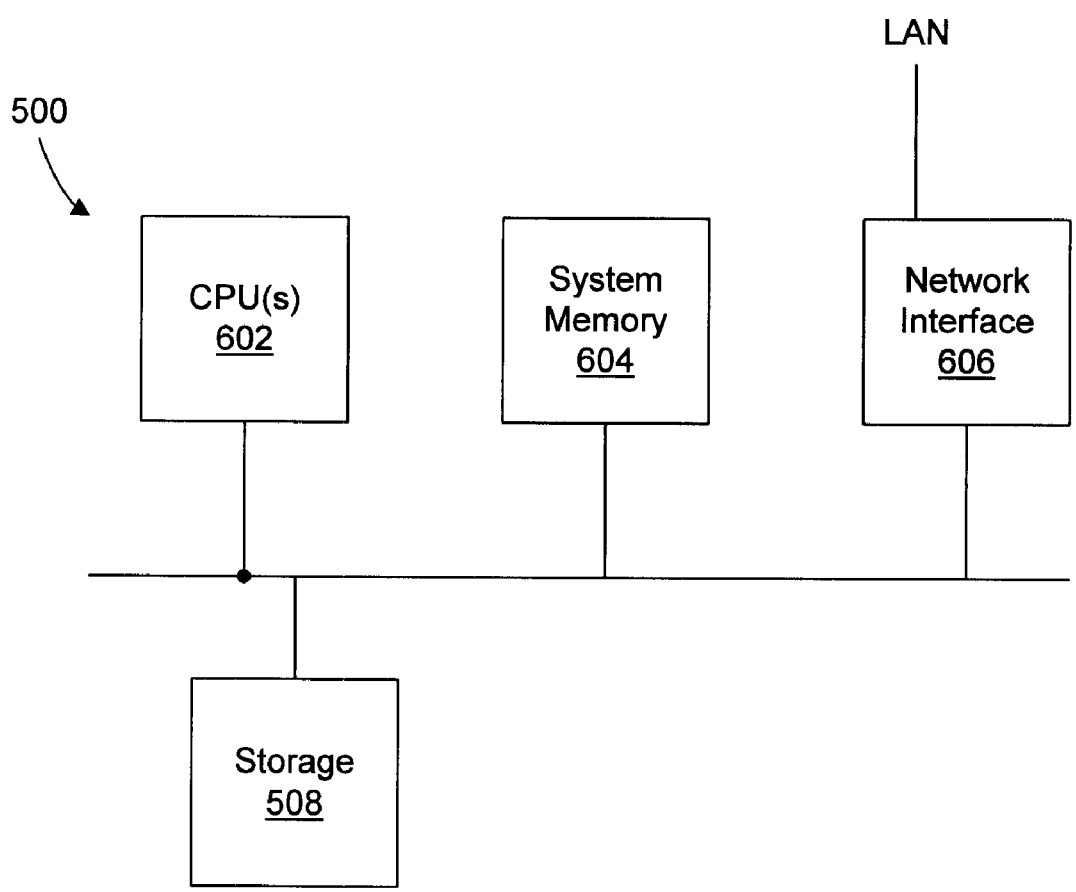
FIG. 5 is a simplified block diagram of components for a single unit that provides all of an office main compute services, according to one embodiment.

Turning now to FIG. 5, a simplified block diagram of components of the single unit 500 is illustrated. Single unit 500 may include one or more CPU's 602 coupled to system memory 604, data network 606, and mass storage 508. Software to implement various computer services, such as file services, email services, web services, and network services may be executed by CPU 602 from system memory 604 and storage 508. These services may be made available to client machines through network interface 606.

Thus, a single computer system may include a network connection 606 configured to be coupled to a network including a plurality of client machines. The single unit 500 also may include a mass storage array configured to be exported or presented to the client machines as one or more file systems through the network connection 606. One or more processors 602 may be included within the single unit 500 and coupled to network connection 606 and mass storage 508. The processors 602 are configured to execute a file server configured to make the one or more file systems available to the client machines through the network connection. Processors may also execute a network server configured to assign network addresses to the client machines, a web server configured to deliver web pages stored on mass storage 508 through the network connection 606, and an email server configured to provide email services for the client machines. The network connection 606, mass storage 508, one or more CPU's 602 configured to perform file server, network server, web server, and email server functions are all included within a single unit configured to be connected to a network through a network connection or interface.

Also included within single unit 500 may be a print server configured to be executed by CPU's 602 to provide printing services for the client machines. A data base server may also be included in the single unit 500 executed on CPU's 602 in order to provide access to a data base stored on storage 508 for the client machines. The one or more processor 602 may execute a multiprocessing operating system. The file server provided by single unit 500 may be configured to present the storage 508 as a NFS (Network File System) or CIFS (Common Internet File System) file system to the network through the network interface 606 so that the file system may be mounted by client machines. The file system may be configured to be accessible by Unix clients and/or Windows clients.

In one embodiment, mass storage 508 may include multiple ATA-type hard drives. Alternatively, SCSI or other types of hard drives may be employed. In one embodiment, single unit 500 providing file services, email services, web services, and network services is implemented as a single field replaceable unit, such as described in conjunction with FIGS. 1, 2, and 3.

Thus, a single system may be provided to provide many computer services required in an office as opposed to employing separate specialized systems for each computer service. For example, file services, web services, email services, and network services may all be preinstalled on a single unit and shipped to a customer so that the customer only has to connect the single system to a network in order to obtain the bulk of the computing services required for a small office. Instead of computing services being distributed across multiple machines, the services are preinstalled and centralized on a single unit. The single unit may be designed with multiple processors and employ a multiprocessing operating system so that sufficient performance is available to provide the plurality of computing services. Also, a large storage is included with the single unit 500 to provide ample space for file, web and email services. Other services, such as printer and database services may be included in the single unit as well. In some embodiments, the single unit may be a single field replaceable unit with limited field serviceable or field replaceable internal parts, as described above.

Figure 6A:
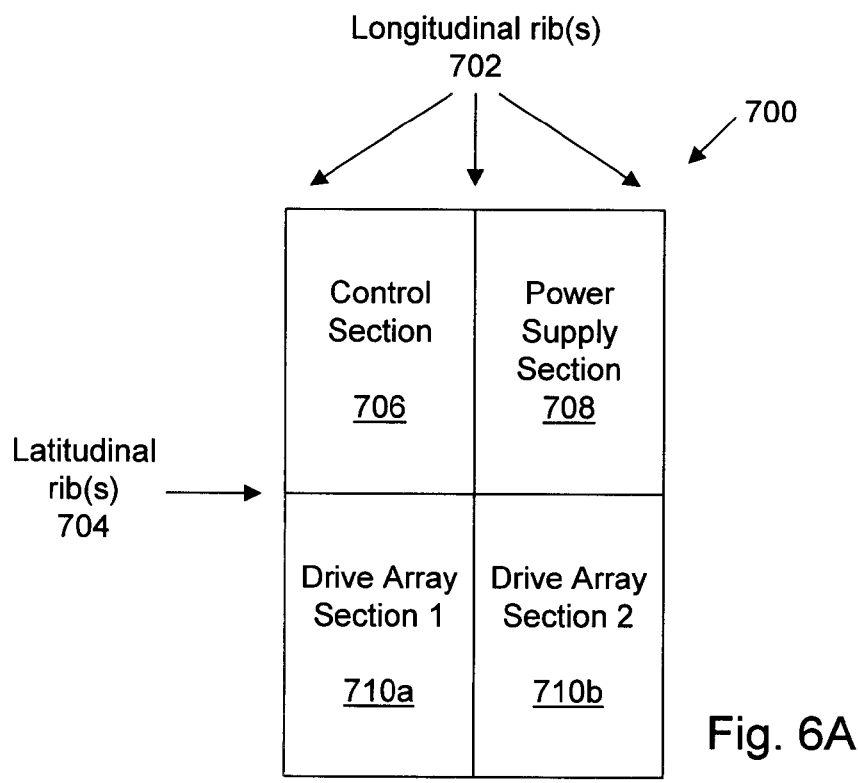
FIG. 6A illustrates a top view of a low profile substrate or tray for packaging a computer system, according to one embodiment.
Figure 6B:
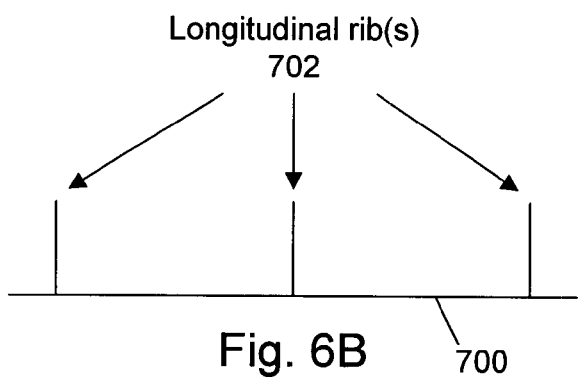
FIG. 6B illustrates a longitudinal side view of a low profile substrate or tray for packaging a computer system, according to one embodiment.
Figure 6C:
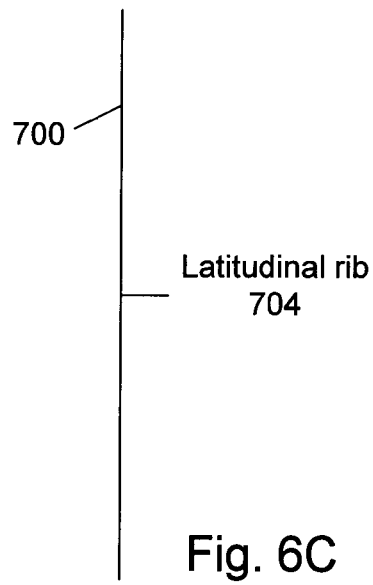
FIG. 6C illustrates a latitudinal side view of a low profile substrate or tray for packaging a computer system, according to one embodiment.

Turning now to FIGS. 6A–6C, a low profile substrate or tray for packaging a computer system is illustrated. A computer system packaged within the substrate or tray 700 may be a single field replaceable unit such as described in conjunction with FIGS. 1, 2, and 3, and/or maybe a single unit system including various office computing services, such as file services, web services, email services, and network services, such as described in conjunction with FIGS. 4 and 5. In a preferred embodiment the substrate 700 and the components mounted on substrate 700 have a maximum height of one inch. In one embodiment, the tray 700 is based on a 16 inch by 22 inch printed circuit board reinforced with ribs 702 and 704 in both x and y dimensions. The substrate 700 is populated with low profile components to implement a computer or storage system. The maximum height for one embodiment of the tray 700, including the PCB thickness, components and necessary clearance, is one inch. The structural ribs 702 and 704 may be oriented to allow front to back air flow and to allow the tray 700 to be slid into a rack or cage independently of other trays 700.

As shown in the top view of FIG. 6A, the computer system tray 700 includes a substrate, one or more longitudinal ribs 702, and one or more latitudinal ribs 704. The number of ribs shown in FIGS. 6A–6C is merely one example and other numbers of ribs may be employed. The ribs divide the substrate into multiple sections. One or more of the sections 710 are configured to hold a two-dimensional array of disk drives. Another section of the substrate, section 706, may be configured to hold circuitry for accessing and managing the two-dimensional array of disk drives. This circuitry may include one or more processors and/or disk array controllers. The substrate 700 includes at least one set of either longitudinal 702 or latitudinal 704 ribs positioned in the direction of a first axis of the substrate. This set of ribs separates the substrate into the different sections configured for holding the drive array and control circuitry. Another section 708 may be included and configured for holding one or more power supplies for supplying power to the drive array and control circuitry.

The substrate may be configured to be mounted in a cage or rack along with other such substrates. In one embodiment, the substrate 700 is configured to be mounted inside a standard 19 inch rack. An edge connector may be provided at the rear of the substrate to provide connectivity to a back plane that interconnects multiple such substrates and/or provides power to the substrates.

The substrate or tray 700 may include a power supply section 708. The tray 700 may receive power (e.g., through an edge connector) from a Telco-standard 48 volt DC supply. Local power regulation may be provided in power supply section 700 to convert the 48V DC signal to the voltages required by the components on the tray 700. Brick and half brick form factor integrated power supply modules (e.g., 0.5 inch×3 inch×5 inch) may be mounted in section 708 to provide the local regulation. The AMPSS modules (e.g., ALBOA, 240W) from ASTEC are examples of such modules. These modules provide a low profile solution.

Figure 6D:
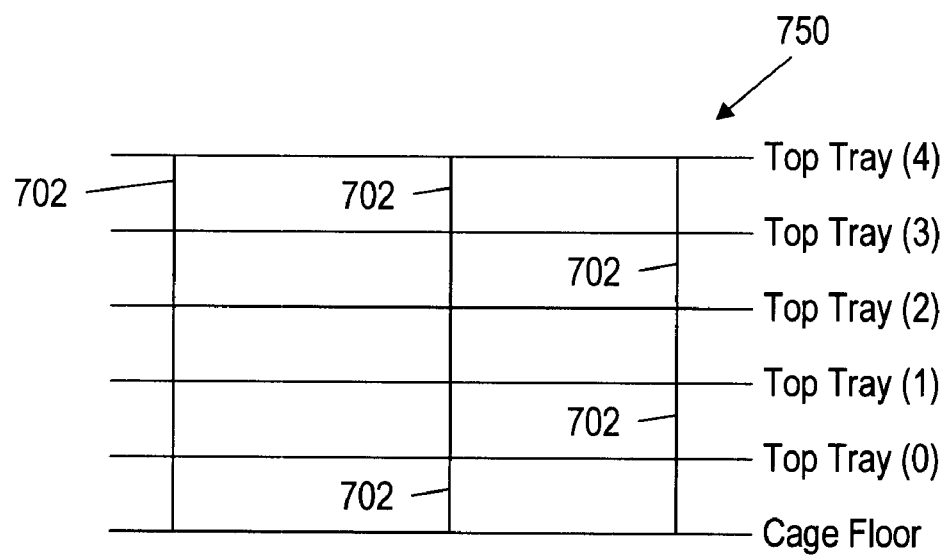
FIG. 6D is an illustration of how multiple trays 700 may be mounted on top of one another within a cage, according to one embodiment.

Turning now to FIG. 6D, an illustration of how multiple trays 700 may be mounted on top of one another within a cage 750 is illustrated. Tray 700 may be mounted in the cage 750 similar to how trays are slid into a bakery rack. Slots may be grooved out in the internal sidewalls in the cage to accommodate the tray, or rails may be provided. Each tray 700 simply slides into the cage from the front and connects to a back plane at the rear of the cage via an edge connector. As mentioned above, the back plane may provide electrical interconnect between the trays and may also provide power connections for the trays. In one embodiment the back plane provides a standard interconnect, such as the PCI bus or a high bandwidth variant of the PCI bus, or a switched interconnect fabric, such as that proposed by the Infiniband Trade Association.

To maximize space, in one embodiment each tray is not individually packaged inside its own metal case. The longitudinal and/or latitudinal ribs provide structural support so that the weight of the tray itself does not cause cracking or collapse once installed in the cage 750. The ribs provide enough strength such that the tray does not collapse under its own weight. To avoid sagging in the middle, components may be mounted on a PCB such that heavier components are distributed near ribs. Also, the ribs are designed to rest on top of one another when mounted in the cage. Dummy trays having ribs but no active components may be inserted in place of trays that are removed or uninstalled. The ribs may extend downward as shown in FIG. 6D to rest on the lower tray or cage floor. Alternatively, the ribs may protrude both above and below the substrate.

Figure 6E:
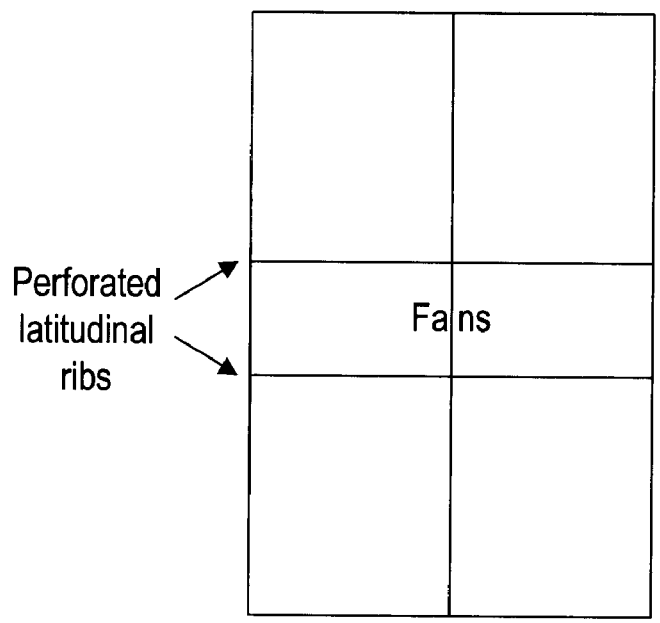
FIG. 6E illustrates a top view of a low profile substrate or tray for packaging a computer system including a row of fans, according to one embodiment.

In one embodiment, the tray 700 may include a row of fans across the tray, as shown in FIG. 6E for example. The fans may be situated between two latitudinal ribs, for example. In this embodiment the latitudinal ribs may be low profile ribs or may be perforated to allow airflow. In addition to, or instead of, providing small fans on the tray itself, the cage in which the trays are mounted may include a set of fans (e.g., 3.5 inch×3.5 inch fans). The cage fans may be located at the back of the cage. To facilitate front to back airflow, the cage back plane may be perforate or otherwise appropriately shaped.

Figure 7:
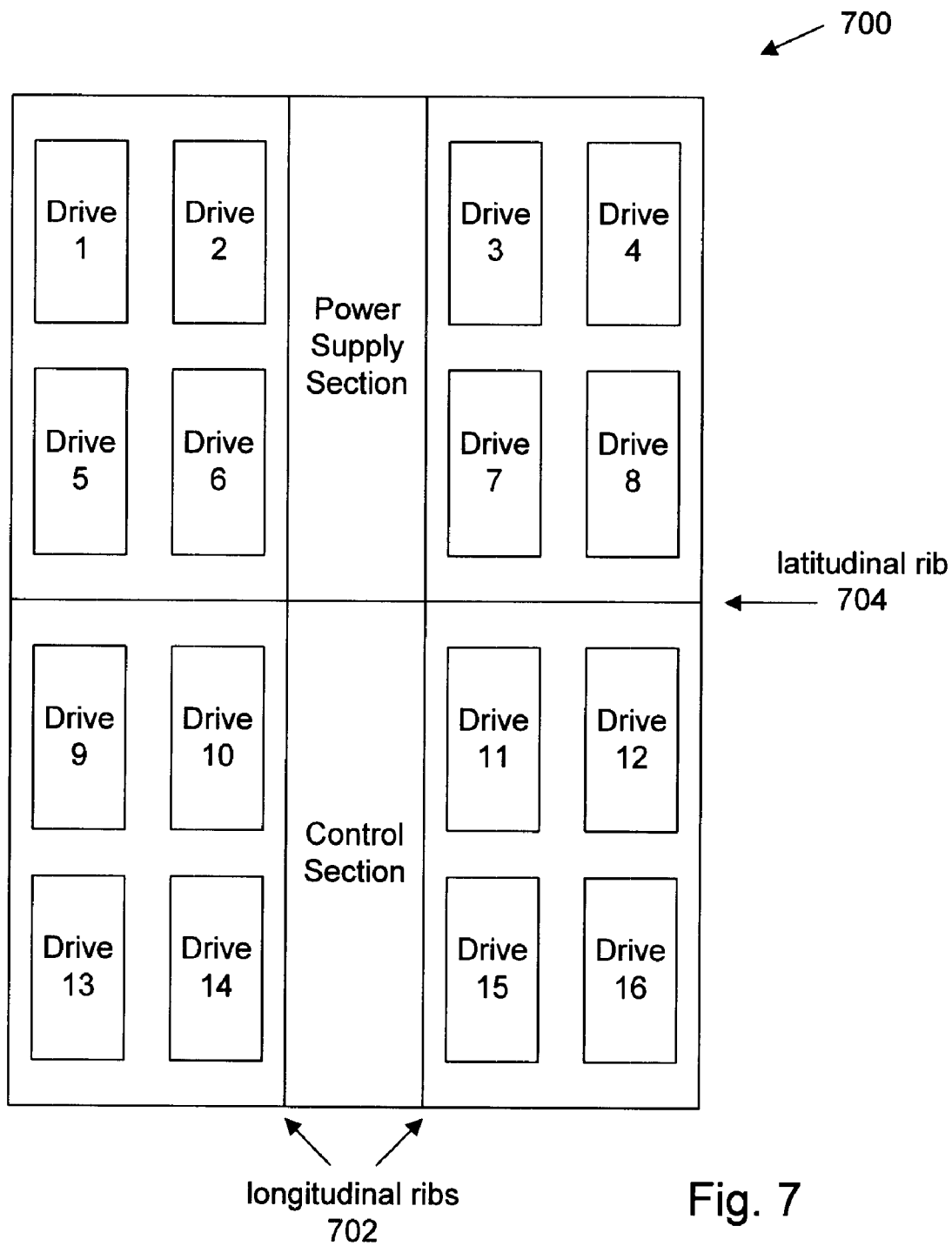
FIG. 7 illustrates a top view of another embodiment of a low profile substrate or tray for packaging a computer system.
Figure 10:
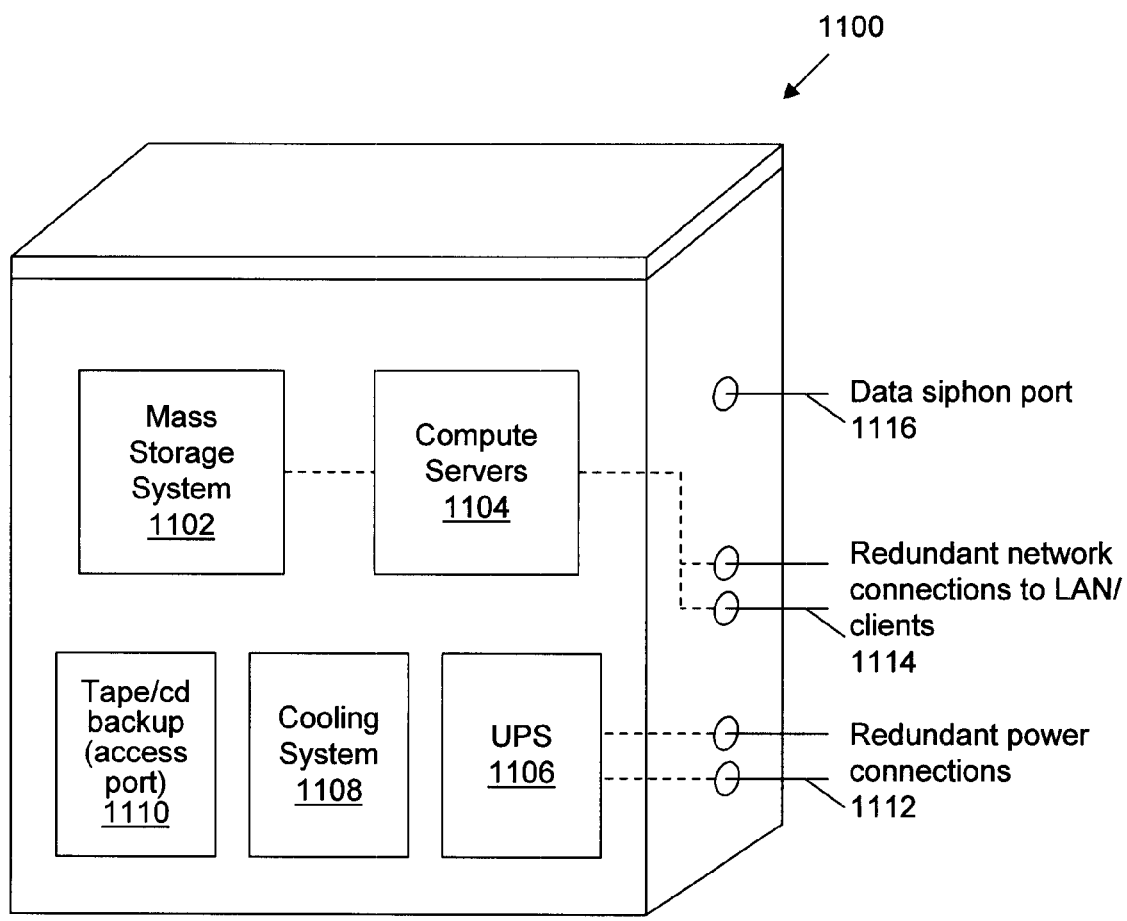
FIG. 10 is an illustration of a computer system including a mass storage system, according to one embodiment.
Figure 11:
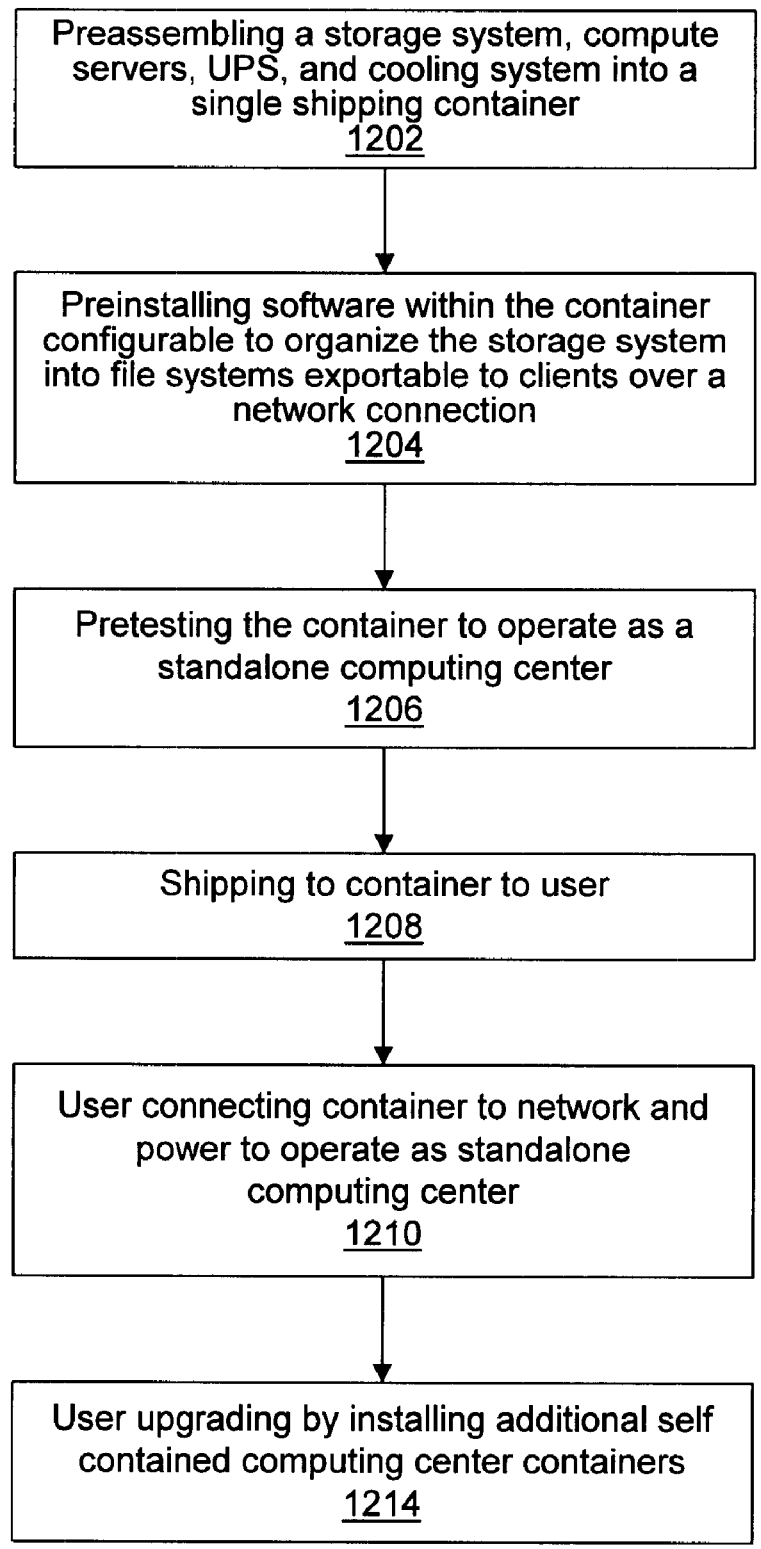
FIG. 11 is a flow diagram illustration of a method for preassembling a storage system to ship within a container to a user according to one embodiment.

Turning now to FIG. 7, another example of a tray 700 is shown. The tray includes a two-dimensional array of disk drives (drives 1–16) mounted on a substrate. The two-dimensional array of disk drives extends across the substrate along a first and second axis of the substrate. Circuitry for controlling or managing the two-dimensional array drives is also mounted to the substrate. The control circuitry may include one or more processors, drive controllers, and drive interconnect components. A first plurality of ribs (e.g., longitudinal ribs 702) are positioned in the direction of the first axis and separate the control circuitry from the array of disk drives.

To provide for a low profile and low power design, hard drives designed for laptop computers may be used for the drives of the two-dimensional array of disk drives. These are typically 2.5 inch disk drives with a 0.7 inch height which do not give out much heat and thus facilitate a high-density design. The embodiment of FIG. 7 shows placing eight disk drives on each of a left and right region. This prevents the substrate from sagging in the middle section. In some embodiments the tray may be further divided by one or more latitudinal ribs 704. The latitudinal ribs may be lower profile ribs or may be perforated to allow for front to back airflow. A latitudinal rib may divide the middle section into a front and back section. The front section may include control circuitry and the rear section may include power supplies. The ribs may be metal ribs and may be fashioned to serve as electromagnetic barriers and/or heat sinks for the power supplies. The power supply section may also include a backup battery as well.

In one embodiment, three trays, such as illustrated in FIG. 7, may be mounted in a single cage or enclosure. Each tray may include sixteen 2.5 inch laptop disk drives (0.7 inches height) for a total of 48 drives providing one terabyte of storage plus 200 gigabytes of hot spare storage, for example. Alternatively, standard 3.5 inch desktop disk drives may be used. The substrate may be designed so that each desktop disk drive occupies the space allotted for two of the smaller 2.5 inch disk drives. This alternate design requires no changes to the substrate except for possibly the addition of a flexible cable to connect 3.5 inch drives to the 2.5 inch drive connector on the substrate. The cage or enclosure may be designed to accept either two trays using the taller 3.5 inch drives or three trays using the lower profile 2.5 inch drives. Each substrate, or alternatively the entire enclosure, may be packaged as a single field replaceable unit as described in regard to FIGS. 1, 2, and 3. Also, multiple office computing servers may be installed on a substrate as described in conjunction with FIGS. 4 and 5.

Turning now to FIGS. 8A–8E, a somewhat more detailed example of a substrate for mounting an array of drives and control circuitry is illustrated. Note that the specific configuration of components and the dimensions shown in FIGS. 8A–8E are merely given as examples. Other dimensions and component placements may be employed in other embodiments.

FIG. 8A shows a top view of the substrate. One or more of the longitudinal ribs 702 and one or more latitudinal ribs 704 separate the substrate into multiple sections. Drives 902 are mounted in one or more of the sections to form an array of disk drives Another section is configured for control circuitry, such as shown on controller board 920. The controller board may include one or more CPU's and drive controllers. In one embodiment, the drives 902 are ATA-type drives and controller board 920 includes an ATA switch device to allow more to two ATA type drives to be connected to each ATA port of an ATA controller. See co-pending U.S. application Ser. No. 09/624,557, entitled "Switch for Selectively Forming a Communication Channel Between a Processing Unit and Multiple Devices, and Associated Data Exchange Methods", filed Jul. 25, 2000, inventor Whay S. Lee, which is hereby incorporated by reference in its entirety, for a description of such an ATA switch device. Anotber section of the substrate is configured to hold one or more power supplies 908. The power supplies provide the required voltages for the disk drives and control circuitry. In one embodiment, the power supplies convert from a 48-volt DC power signal provided on edge connector 904. Edge connector 904 may include redundant power supplies so that if one supply falls or if the power supply connection to the edge connector for one power track fails, power will still be available on the redundant track or supply. Alternatively, or additionally, the power supplies my include a memory battery backup power supply.

FIG. 8B and FIG. 8C show side views of the substrate in the longitudinal and latitudinal directions respectively. FIG. 8D shows a perspective view of the substrate. Turning now to FIG. 8E, a detail section of a corner of the substrate is illustrated. As shown in FIG. 8E, the longitudinal ribs may include a top portion 930 and a bottom portion 932. The bottom portion 932 may be configured to mate with a corresponding top portion 930 of a lower tray when the trays are mounted in a cage or enclosure. Thus, the longitudinal ribs and/or latitudinal ribs of each tray may be configured to rest upon ribs of a lower tray when mounted in a cage. Also, the substrate may include protrusions 940 along the longitudinal edges for sliding into grooves or rails in the internal sidewalls of a cage, rack or other enclosure. Thus, the trays may be slid into a cage to form a vertical stack of trays resting upon each other's ribs. If one tray is removed, a dummy tray may be inserted to provide rib support so that the trays do not have to be reconfigured within the cage.

The cage may include a back plane with connectors for edge connectors on each tray. The back plane may provide I/O and/or network connectivity. In one embodiment the back plane provides a switched, point-to-point I/O interconnect fabric for the trays. The cage may be configured with slots or rails to accept trays of different height form factors, such as 1.75 inch trays and 1 inch trays.

Turning now to FIGS. 9A–9F, an example of such a cage or enclosure is illustrated in various views. FIG. 9A illustrates three trays mounted in a single cage. FIG. 9A also illustrates how each tray may rest upon the ribs of a lower tray or upon the floor of the cage. As shown in FIG. 9B, the cage may include multiple fans at the rear of the cage. The fans are configured to provide cooling for all of the trays mounted in the cage. In one embodiment the fans are behind the cage back plane and the cage back plane is perforated or otherwise shaped to allow front to back airflow through the cage. FIG. 9C shows a back view of the cage showing multiple fans, and FIG. 9D shows a front view of the cage showing three trays mounted within the cage with the fans at the rear. FIG. 9E is a side view of the cage and FIG. 9F is a perspective view of the cage.

Various modifications and changes may be made as would be obvious to a person skilled in the art having the benefit of this disclosure. It is intended that the following claims be interpreted to embrace all such modifications and changes and, accordingly, the specifications and drawings are to be regarded in an illustrative rather than a restrictive sense.

What is claimed is:

1. A substrate for packaging a system. comprising:
   first one or more sections of the substrate configured to hold a two-dimensional array of disk drives;
   a second section of the substrate configured to hold circuitry for accessing said two-dimensional physical array of disk drives, wherein said circuitry comprises one or more processors; and
   a first plurality of ribs positioned in the direction of a first axis of the substrate, wherein the first plurality of ribs separate said first one or more sections from each other and from said second section.

2. The substrate as recited in claim 1, wherein said second section is further configured to hold one or more power supplies for supplying power to said two-dimensional array of disk drives and said circuitry.

3. The substrate as recited in claim 1, wherein said substrate is configured to be mounted in a cage or rack.

4. The substrate as recited in claim 3, further comprising an edge connector at one edge of the substrate configured to provide electrical connectivity to a backplane in said cage or rack.

5. The substrate as recited in claim 3, wherein two of said first plurality of ribs are each proximate a respective parallel edge of said substrate, wherein the substrate further comprises a lateral protrusion extending along each said respective parallel edge configured for mounting the substrate in said cage or rack by sliding the substrate into said cage or rack.

6. The substrate as recited in claim 1, further comprising a second plurality of ribs positioned in the direction of a second axis of the substrate perpendicular to said first axis.

7. The substrate as recited in claim 6, wherein said second section is further configured to hold one or more power supplies for supplying power to said two-dimensional array of disk drives and said circuitry, wherein said one or more power supplies are separated from said circuitry by one or more of said second plurality of ribs.

8. The substrate as recited in claim 6, further comprising a third section transverse to said first one or more sections and said second section, wherein said third section is configured to hold a row of fans.

9. The substrate as recited in claim 8, wherein said third section is defined by two of said second plurality of ribs that are perforated to facilitate air flow in the direction of said first axis.

10. The substrate as recited in claim 6, wherein said second plurality of ribs have a lower profile than said first plurality of ribs.

11. The substrate as recited in claim 1, further comprising protrusions on the bottom of the substrate aligned with said first plurality of ribs, wherein said protrusions are configured to mate with ribs of a second similar substrate mounted underneath the substrate.

12. The substrate as recited in claim 1, wherein the substrate comprises a printed circuit board, and wherein said two-dimensional array of disk drives, said circuitry, and said first plurality of ribs are mounted to said printed circuit board.

13. The substrate as recited in claim 1, wherein the substrate including said first plurality of ribs is less than or equal to one inch thick.

14. A system, comprising:
a two-dimensional array of disk drives mounted to a substrate, wherein said two-dimensional array of disk drives extends across said substrate along a first axis and a second axis of the substrate;
circuitry for controlling said two-dimensional array of disk drives, wherein said circuitry is mounted to said substrate and comprises one or more processors; and
a first plurality of ribs positioned in the direction of said first axis separating said two dimensional array of disk drives from said circuitry.

15. The system as recited in claim 14, wherein said first plurality of ribs separates said two-dimensional array of disk drives into two sections.

16. The system as recited in claim 15, wherein said two sections are separated by a third section comprising said circuitry.

17. The system as recited in claim 16, wherein said third section further comprises one or more power supplies for supplying power to said two-dimensional array of hard drives and said circuitry.

18. The system as recited in claim 14, further comprising one or more power supplies mounted to said substrate, wherein said one or more power supplies are configured to supply power to said two-dimensional array of hard drives and said circuitry.

19. The system as recited in claim 18, wherein said one or more power supplies comprises a redundant power supply configured to supply power to said two-dimensional array of hard drives and said circuitry if another one of said power supplies fails.

20. The system as recited in claim 18, wherein said one or more power supplies are configured to regulate a 48V DC input down to voltages required by said two dimensional array of disk drives and said circuitry.

21. The system as recited in claim 18, wherein said one or more power supplies comprises a back-up battery for memory comprised within said circuitry.

22. The system as recited in claim 18, further comprising a second plurality of ribs positioned in the direction of said second axis of the substrate perpendicular to said first axis.

23. The system as recited in claim 22, wherein one or more of said first or second plurality of ribs are configured to serve as an electromagnetic interference (EMI) shield for said one or more power supplies.

24. The system as recited in claim 22, wherein one or more of said first or second plurality of ribs are configured to serve as a heat sink for said one or more power supplies.

25. The system as recited in claim 22, wherein one or more of said first or second plurality of ribs separates said one or more power supplies from said circuitry.

26. The system as recited in claim 14, further comprising a second plurality of ribs positioned in the direction of said second axis of the substrate perpendicular to said first axis.

27. The system as recited in claim 26, wherein said second plurality of ribs are perforated to facilitate air flow in the direction of said first axis.

28. The system as recited in claim 26, wherein said second plurality of ribs have a lower profile than said first plurality of ribs.

29. The system as recited in claim 14, further comprising a row of fans positioned in the direction of said second axis.

30. The system as recited in claim 29, where said row of fans are configured to be powered by a power supply independent from a power supply for said two-dimensional array of disk drives.

31. The system as recited in claim 14, wherein said two-dimensional array of disk drives are configured as a RAID storage system.

32. The system as recited in claim 14, wherein said two-dimensional array of disk drives, said substrate, said circuitry, and said first plurality of ribs are configured to be mounted in a cage or rack.

33. The system as recited in claim 32, further comprising an edge connector at one edge of the substrate configured to coupled said two-dimensional array of disk drives to an I/O bus or network.

34. The system as recited in claim 32, further comprising an edge connector at one edge of the substrate configured to couple said two-dimensional array of disk drives to a switched point-to-point interconnect fabric.

35. The system as recited in claim 14, wherein said substrate comprises a printed circuit board, and wherein said two-dimensional array of disk drives, said circuitry, and said first plurality of ribs are mounted to said printed circuit board.

36. The system as recited in claim 35, wherein said two-dimensional array of disk drives, said substrate, and said circuitry are packaged as a single field replaceable unit (FRU) with no field serviceable internal parts so that said two-dimensional array of disk drives, said substrate, and said circuitry are configured not to be individually field serviceable or field replaceable.

37. The system as recited in claim 36, wherein said single field replaceable unit is less than or equal to one inch thick.

38. A cage mounted system comprising:

a cage comprising a plurality of slots;

a plurality of trays each mounted in one of said slots, wherein each one of said plurality of trays comprises a first plurality of ribs positioned in the direction of a horizontal first axis;

and wherein one of said trays comprises:

a two-dimensional array of disk drives mounted to a substrate, wherein said two-dimensional array of disk drives extends across said substrate along a first axis and a second axis of the substrate; and circuitry for controlling said two-dimensional array of disk drives, wherein said circuitry is mounted to said substrate and comprises one or more processors.

39. The system as recited in claim 38, wherein said plurality of trays are mounted in said cage in a vertical stack.

40. The system as recited in claim 39, wherein bottom portions of said first plurality of ribs on each tray are configured to rest upon corresponding top portions of said first plurality of ribs for an immediately lower tray.

41. The system as recited in claim 40, wherein one of said trays comprises a dummy tray configured to provide mechanical support for said tray comprising said two-dimensional array of hard drives and said circuitry, wherein said dummy tray is positioned within said cage in one of said slots immediately underneath said tray comprising said two-dimensional array of hard drives and said circuitry.

42. The system as recited in claim 38, further comprising a backplane at the back of said cage, wherein said backplane is configured to provide power and I/O signals to said trays.

43. The system as recited in claim 42, wherein said backplane is configured to provide redundant power paths to each tray.

44. The system as recited in claim 42, wherein said backplane is configured to provide connection to an I/O bus or network for one or more of said trays.

45. The system as recited in claim 42, wherein said backplane is configured to provide connection to a switched point-to-point I/O interconnect fabric for one or more of said trays.

46. The system as recited in claim 42, further comprising one or more fans at the back of said cage, wherein said one or more fans are configured to provide air flow across said trays.

47. The system as recited in claim 46, wherein said backplane is perforated to facilitate said air flow.

48. The system as recited in 38, wherein each said slot comprises rails on opposed sides of said cage, and wherein each tray is configured to slide into said cage on said rails.

49. The system as recited in claim 38, wherein one of said trays comprises a power supply tray configured to convert an AC line voltage to a DC voltage and supply said DC voltage to other ones of said trays.

50. The system as recited in claim 38, wherein each tray is a single field replaceable unit (FRU) with no field serviceable internal parts.

51. The system as recited in claim 38, wherein each tray has a maximum height of one inch.

52. The system as recited in claim 38, wherein slots of said cage are configured to accommodate trays having a maximum height of one inch or trays having a maximum height of 1.75 inches.

* * * * *